April 27, 1937.  O. Y. LADD  2,078,575
EYEGLASS MOUNTING
Filed March 19, 1935
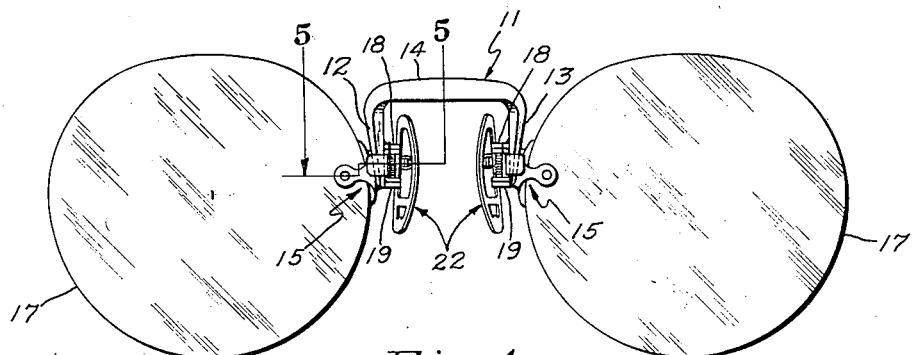
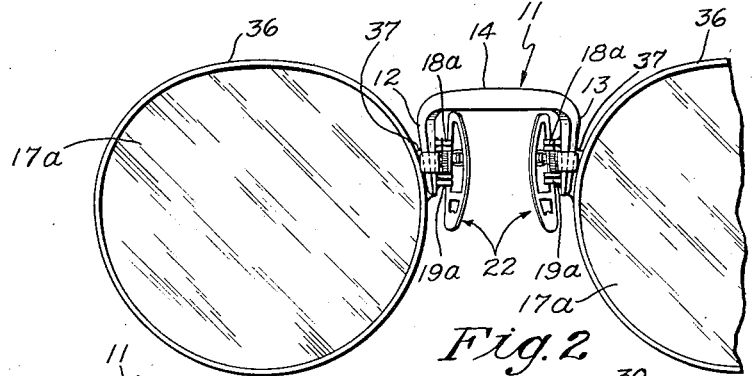
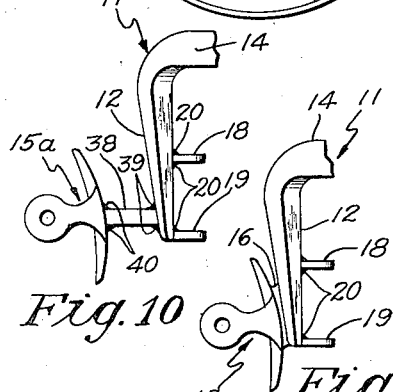
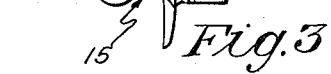
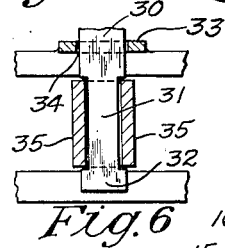
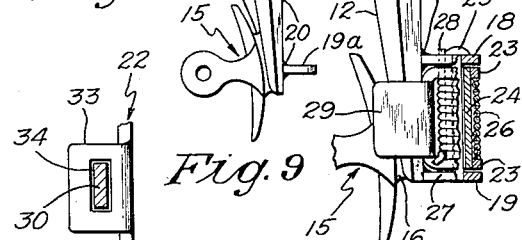
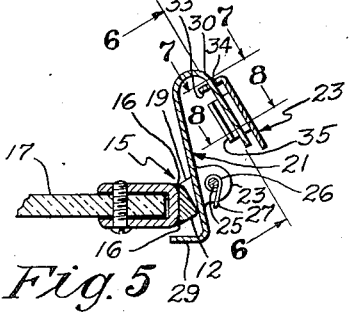
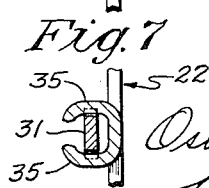
INVENTOR
Osmond Y. Ladd
BY Wooster & Davis
ATTORNEYS Patented Apr. 27, 1937

2,078,575

UNITED STATES PATENT OFFICE 2,078,575

EYEGLASS MOUNTING

Osmond Y. Ladd, Danbury, Conn.

Application March 19, 1935, Serial No. 11,802

7 Claims. (Cl. 88—50)

This invention relates to new and useful improvements in eyeglass mountings.

An object of the invention is to provide an improved mounting for the oscillating arms carrying the nose guards or nose pieces in eyeglasses, whereby the bridge cannot cause dislodgment of the glasses from the nose of a wearer, the danger of bridge breakage at an arm mounting is eliminated, the arms are firmly mounted on the bridge and may be mounted at different heights on the bridge, interference of the bridge with the arms is prevented, and the mounting of the arms close to the lenses is provided for whereby larger lenses may be used.

Another object is to provide in an eyeglass of the class indicated an improved connection between the oscillating arms and the nose pieces carried by said arms.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a front elevational view on an enlarged scale showing the invention as applied to a pair of rimless glasses, the oscillating arms being mounted at the lower ends of the bridge;

Fig. 2 is a similar view showing the invention incorporated in a pair of eyeglasses the lenses of which are rimmed, the oscillating arms being mounted above the lower ends of the bridge;

Fig. 3 is an enlarged front elevational view showing one end portion of the bridge of Fig. 1;

Fig. 4 is a view partly in elevation and partly in section, on an enlarged scale and showing the mounting of an oscillating arm by means of a tube about a pivot pin;

Fig. 5 is an enlarged sectional view taken substantially along the plane of the line 5—5 of Fig. 1;

Fig. 6 is a sectional view taken substantially along the plane of the line 6—6 of Fig. 5;

Fig. 7 is a sectional view taken substantially along the plane of the line 7—7 of Fig. 5;

Fig. 8 is a sectional view taken substantially along the plane of the line 8—8 of Fig. 5;

Fig. 9 is a view similar to Fig. 3 but showing the oscillating arm mounting lugs disposed above the lower ends of the bridge;

Fig. 10 is a view similar to Fig. 3 but showing a different arrangement of the lens holder.

Fig. 11 is a front view of a modified guard construction; and

Fig. 12 is a section thereof substantially on line 12—12 of Fig. 11.

Referring in detail to the drawing, and at first particularly to Figs. 1 through 8, the improved mounting is shown as incorporated in a pair of eyeglasses including a bridge generally designated 11 and substantially in the form of an inverted U including spaced downwardly extending arms 12 and 13 and a connecting portion 14. To the outer sides of the arms 12 and 13 are secured lens holders generally designated 15 of any or the usual construction. These lens holders may be soldered or otherwise secured to the downwardly extending arms of the bridge piece as indicated at 16, and in Fig. 1 each holder is shown as securing a rimless lens 17 to the bridge.

A pair of vertically spaced lugs 18 and 19 are secured to the inner side of each bridge arm as by solder 20 and they are mounted so that their free ends project laterally outward from the inner side of the bridge. Each such pair of lugs serves to mount an oscillating arm generally designated 21. Such arms are duplicates of one another but are mounted to provide rights and lefts, and each oscillating arm carries a nose piece or nose guard 22, the construction and mounting of which will later be more fully described. Since the oscillating arms 21 are duplicates of one another, a detailed description of one arm will, it is believed, be sufficient for both.

As shown best in Figs. 4 and 5 the arm 21 intermediate its ends is provided with vertically spaced ears 23 which ears extend laterally from the upper and lower edges respectively of the arm and are arranged in vertical alignment. In the arrangement of Fig. 4 a tube 24 has its end portions secured in aligned openings in the ears 23 and when the arm 21 is so positioned that its ears are between the lugs 18 and 19 of the bridge a pivot pin 25 is passed through the upper bridge lug 18, the tube 24 of the oscillating arm and is secured in the lower bridge lug 19. With this construction the oscillating arm is mounted for pivotal movement about the pin 25 and the tube 24 comprises a bushing to relieve the ears 23 of the oscillating arm from wear and also provides a long bearing whereby the oscillating arm is firmly mounted. A coil spring 26 is disposed about the tube 24 between the ears 23 of the oscillating arm, and one end 27 of said spring bears against the lower ear 23 of the arm 21 while the other end 28 of the spring bears against the lug 18 which is rigid with the bridge. The tube 24 may however, be omitted as shown in Fig. 5 and the ears 23 mounted to turn directly on the pin 25, if preferred.

When the pair of oscillating arms 21 are mounted on the bridge 11 the springs 26 of the respective arm tend to rock the arms about the pivot pins 25 in directions to carry the nose pieces 22 toward one another to cause them to grip the bridge of the nose of the wearer. The forward ends of the arms 21 are bent laterally to provide finger pieces 29, and by engaging the finger pieces of the two arms and pressing such finger pieces toward one another the arms are moved about the pivot pins 25 so as to carry the nose pieces 22 away from one another or to open such nose pieces, so that the eyeglasses may be disposed on or removed from the bridge of the nose of the wearer.

Each arm 21 is bent to provide a forwardly extending portion 30 which slightly inwardly of its free end has its opposite edge portions cut away to provide a reduced or narrow portion 31 having a head-like portion 32 at its outer end. The arm portions 30 mount the nose pieces 22, each of which is formed from a single piece of metal and includes an ear portion 33 extending in angular relation to its body portion and having an opening 34 therethrough through which the arm portion 30 extends. Further, each nose piece has a pair of lugs 35 lanced and pressed therefrom and bent about the reduced or narrow portion 31 of the arm portion 30. The lugs 35 are not tightly clamped about the portion 31 and the opening 34 in the ear 33 is of such size that the arm portion 30 passes freely through it.

With the described construction the nose pieces 22 will have a limiting oscillating movement on the arm portion 30 that they may adjust themselves to seat properly against the sides of the bridge of the nose of a wearer. Since the lugs 35 of the nose pieces are about the reduced portion 31 movement of the nose pieces in directions longitudinally of the arm portion 30 will be limited by the shoulders at the ends of the reduced portion 31, the head-like portion 32 preventing movement of a nose piece off its arm. Should the nose pieces become too loose on the oscillating arms then the lugs 35 may be pinched with a pair of pliers against the reduced portions 31 of such arms so as to more tightly embrace such portion and limit the movements of the nose pieces relative to the oscillating arms.

Since the lugs 18 and 19 are soldered or otherwise secured to the inner sides of the downwardly extending arms of the bridge such lugs may be secured in any desired locations along the lengths of such arms. This may be accomplished without changing the relationship of the lenses and bridge. If desired, the lower lugs 19 may be secured to the lower end portions of the bridge arms as in Figs. 1 and 3 or the lugs 19 may be secured to the bridge arms above or in spaced relations to the lower ends of the latter and the lugs 18 located accordingly as shown in Fig. 9. With this construction it will therefore be apparent that there is no need to bend the bridge or to offset the oscillating arms in order to have the nose pieces properly located for use by any particular wearer. In Figs. 2 and 9 the lugs designated 19a are located above the lower ends of the bridge arms and the lugs 18a are located with respect to the lugs 19a.

It will be understood (see Fig. 2) that lenses 17a provided with narrow metal rims 36 may be substituted for the lenses 17 and in such instance the rims themselves may form the lens holders and may be secured directly to the outer sides of the bridge arms by solder or the like 37. Since adjustment of the oscillating arms and the nose piece carried thereby is accomplished by shifting the lugs or positioning the lugs with respect to the bridge arms it will be apparent that such adjustment may be made without changing the positions of the lenses relative to the bridge and without bending of the bridge. When the oscillating arms are mounted by lugs secured to the inner sides of the vertical bridge arms these oscillating arms are next to the nose of the wearer so that there is no danger of the bridge causing dislodgment of the eyeglasses from the nose of the wearer.

Also, with the described construction there is no occasion for drilling holes in the bridge or nose wire for pivot pins on which to mount the oscillating arms and accordingly there is no weakening of the bridge. Further, there is no movement of the oscillating arms against a portion of the bridge in a manner to wear and weaken the latter, and accordingly there is no danger of bridge breakage at the mountings for the oscillating arms. A single mounting lug 18 or 19 may be used but it is preferred to use two of them as providing a stronger and more rigid mounting for the oscillating arms. By use of the double lugs the oscillating arms are firmly mounted, and further since these arms are not mounted on bent end portions of the bridge there is no interference between the arms and bridge. As the mounting lugs 18 and 19 may be positioned at different heights or locations on the bridge arms they may be properly located to position the nose pads without offsetting the oscillating supporting arms 21. Therefore, the pressure of these arms is in the plane of the pivoted mounting instead of offset laterally therefrom to thus cause cramping of the arms on the pivotal mounting. Further as these mounting lugs can be placed higher or lower on the bridge arms as desired relative to the centers of the lenses it is not necessary to shift the lens clips 15. Thus I provide a strong rigid construction between the lens clips and the bridge and then can place the lugs for the oscillating arms where desired, that is higher or lower depending on the nose of the wearer and other considerations. Oscillating arms and nose pads of any desired type may be used and it is a simple matter to change from one type to another if desired. Additionally by the use of these lugs and the mounting of the arm at the inner side of the bridge it is possible to bring the lenses up close to the bridge so that lenses of large diameter may be used. That is, there is no occasion, ordinarily, for leaving a space between the vertical arms of the bridge and the adjacent portions of the lenses.

However, if desired, the lens holders may be secured to the bridge arms spaced outwardly therefrom as shown in Fig. 10. In that figure a short bar 38 has one end welded to a bridge arm at 39 while its other end is welded to a lens holder 15a as at 40. With this construction the bar 38 may be bent in the desired direction so as to adjust the positions of a lens with respect to a bridge without distorting or weakening the bridge or the oscillating arm connection, including the lugs 18 and 19, with the bridge.

In short by the use of these mounting lugs the oscillating arm is next to the nose so that the bridge has no chance of dislodging the glasses. By the use of these lugs and the rearrangement of the bridge mount, bridge breakage near the guard mount is eliminated. By use of the double lugs, guard and screw weaknesses are eliminated. In the old style of mount where the oscillating arm is pivoted on the bridge adjacent the lens clip the arm through use wears and weakens the bridge, whereas in my improved mount wear due to use will never have any effect on the strength of the bridge as the wear is on the lugs or pin independently of the bridge.

Also, these lugs eliminate bridge interference with the oscillating arms, and it is possible to mount the oscillating arm very close to the lens, allowing use of larger lens, as well as to mount the oscillating arms at different heights on the bridge to properly locate the arms relative to the bridge and the lenses.

In Figs. 11 and 12 is shown a modified guard construction which may be used. The guard arm 41 has the lugs 42 by which it may be pivoted between the lugs 18 and 19 on the bridge. At one end is a finger clip 43 corresponding to clip 29 and at the other end is bent backwardly to pass through an opening in an ear 44 on the guard 45. Passed loosely through an opening adjacent the free end of the arm is a screw 46 threaded into a tapped opening 47 in the guard. As the screw is loose in the opening in the lever the guard has limited rocking movement on the lever to permit it to properly adjust itself to seat comfortably on the nose. The guard may be provided with a number of the tapped openings 47 as shown in Fig. 11 so that the guard may be adjusted to different angles as shown in dotted lines, depending on into which opening the screw is threaded. If desired the screw could pass through openings in the guard and be threaded in a tapped opening in the arm. If preferred the fastening or screw 46 may be a rivet in which case of course after once applied it would be permanent but the guard could be provided with the plurality of holes 47 so the guard could be mounted at the proper angle when the rivet is applied.

Having thus set forth the nature of my invention, what I claim is:

1. In an eyeglass mounting, a bridge including a pair of downwardly extending arms, lens holders secured to the arms on the outer sides of said arms, a pair of vertically spaced lugs secured to each of said arms at the inner sides thereof, a pair of oscillating arms, a pair of vertically spaced ears on each of said oscillating arms, a tube passing through each pair of said ears, pins passing through said lugs and tubes and pivotally mounting the oscillating arms on the lugs, and a nose piece carried by each of said oscillating arms.

2. In an eyeglass mounting, a bridge, oscillating arms mounted on the bridge, a nose guard having an ear with an opening through it for the arm to pass, said arm having an opening near its free end, said guard being provided with a plurality of tapped openings, and a screw passing through the opening in the arm and threaded into one of the openings in the guard.

3. In an eyeglass mounting, a bridge including a pair of downwardly extending spaced arms, lens holders on the outer sides of said arms, supports formed separate from the arms, means for attaching the supports to the arms at the inner sides of said arms whereby said supports may be located at any desired position on the arms, and a pair of oscillating arms pivoted on said supports and each carrying a nose piece.

4. In an eyeglass mounting, a bridge including a pair of downwardly extending spaced arms, lens holders on the outer sides of said arms, a pair of vertically spaced lugs at the inner side of each of said arms, means for attaching the lugs to the arms whereby the lugs may be located at any desired positions on the arms, pivot means between the lugs of each of said pair, an oscillating arm on each of said pivot means, and a nose piece on each of said oscillating arms.

5. In an eyeglass mounting, a bridge including a pair of downwardly extending arms, lens holders soldered to the arms on the outer sides of said arms, a lug soldered to the inner side of each of said arms whereby the lugs may be positioned at any desired locations on the arms, a pair of oscillating arms, means pivoting one of said oscillating arms to each of said lugs, and a nose piece carried by each of said oscillating arms.

6. In an eyeglass mounting, a bridge including a pair of downwardly extending arms, lens holders soldered to the arms on the outer sides of said arms, a pair of vertically spaced lugs soldered to the inner side of each of said arms whereby said lugs may be positioned at any desired location on the arms, a pair of oscillating arms, means pivoting one of said oscillating arms between its ends to each pair of said lugs, and a nose piece carried by each of said oscillating arms.

7. In an eyeglass mounting, a bridge including a pair of downwardly extending spaced arms, a lug soldered to the inner side of each of said arms whereby the lugs may be positioned at any desired location on the arms, a pair of oscillating arms pivoted one on each of said lugs, a nose piece carried by each of said oscillating arms, a pair of short bars each soldered at its inner end to the outer side of a bridge arm, and a lens holder on the outer end of each of said bars.

OSMOND Y. LADD.